US012625160B2

(12) United States Patent　　　(10) Patent No.:　US 12,625,160 B2
Rivolta et al.　　　　　　　　　　(45) Date of Patent:　　May 12, 2026

(54) ALWAYS-ON SHOCK AND ORIENTATION DETECTION

(71) Applicant: STMicroelectronics International N.V., Geneva (CH)

(72) Inventors: Stefano Paolo Rivolta, Desio (IT); Piergiorgio Arrigoni, Domodossola (IT)

(73) Assignee: STMicroelectronics International N.V., Geneva (CH)

( * ) Notice: Subject to any disclaimer, the term of this patent is extended or adjusted under 35 U.S.C. 154(b) by 316 days.

(21) Appl. No.: 18/410,704

(22) Filed: Jan. 11, 2024

(65) Prior Publication Data

US 2025/0231216 A1　　Jul. 17, 2025

(51) Int. Cl.
*G01P 15/08*　　　(2006.01)
*G01C 19/00*　　　(2013.01)
*G01P 15/18*　　　(2013.01)

(52) U.S. Cl.
CPC .............. *G01P 15/18* (2013.01); *G01C 19/00* (2013.01)

(58) Field of Classification Search
CPC ...... G01P 15/18; G01P 15/0891; G01P 15/02; G01C 19/00; G01C 19/02–54; G01C 19/56–58; G06F 1/324; G06F 1/3287; G06F 1/3206; G06F 11/3058; G06F 11/3044; G06Q 10/20
USPC .................... 73/489, 491, 495, 54.02–54.04, 73/54.08–54.16, 54.18, 514.02, 514.03, 73/514.15–514.35; 702/141, 145; 340/669, 671
See application file for complete search history.

(56) References Cited

U.S. PATENT DOCUMENTS

| | | | |
|---|---|---|---|
| 9,689,887 B1 | 6/2017 | Srinivas et al. | |
| 2012/0253738 A1 | 10/2012 | Nasiri et al. | |
| 2015/0331805 A1 | 11/2015 | Daga et al. | |
| 2018/0117373 A1 | 5/2018 | Cuny | |
| 2020/0342737 A1 | 10/2020 | Pham et al. | |
| 2022/0026456 A1* | 1/2022 | Kim ......................... G01P 3/00 | |
| 2022/0246015 A1 | 8/2022 | Wang et al. | |
| 2023/0029857 A1 | 2/2023 | Goel et al. | |
| 2023/0215269 A1* | 7/2023 | Raziq .................... G16H 40/67 | |
| | | | 340/519 |

OTHER PUBLICATIONS

"MPU-6000 and MPU-6050 Product Specification Revision 3.4," InvenSense, 52 pages, 2013, www.invensense.com.

* cited by examiner

*Primary Examiner* — Robert R Raevis
(74) *Attorney, Agent, or Firm* — Seed Intellectual Property Law Group LLP

(57)　　　　　　ABSTRACT
The present disclosure is directed to shock and orientation detection for an electronic device. The shock detection detects shock events, such as an accidental drop of the device, and the orientation detection detects the orientation of the device at the time of the detected shock event. The detected shock event and orientations are stored in non-volatile memory. The shock and orientation detection are implemented in low power hardware without any host intervention, and may be implemented as an always-on feature that executes even when the device is in an off or low power state.

20 Claims, 2 Drawing Sheets

ALWAYS-ON SHOCK AND ORIENTATION DETECTION

BACKGROUND

Technical Field

The present disclosure is directed to shock and orientation detection for electronic devices.

Description of the Related Art

Many companies offer a standard warranty with a purchase of an electronic device, such as a laptop, tablet, and smartphone. Standard warranties typically offer complementary repair or replacement for damage caused by defective materials or workmanship, and do not cover physical damage caused by the user. For example, physical damage caused by shock events, such as accidental falls or drops, are often not covered under warranty, but offered at an additional cost.

Unfortunately, some users take advantage of the standard warranty for damages caused by shock events since companies are unable to recognize whether damage was caused by the user or not. Consequently, companies often unnecessarily repair devices under standard warranties at their own expense.

BRIEF SUMMARY

The present disclosure is directed to devices and methods for shock and orientation detection. The shock detection detects shock events, such as accidental drops of the device, and the orientation detection detects the orientation of the device at the time of the shock event. The shock and orientation detection results may be used by companies to evaluate the validity of warranty claims for the device.

The shock and orientation detection includes power management features in order to conserve power. Namely, the device performs motion detection using accelerometer measurements in order to detect movement of the device. In case the device is determined to be stationary, shock detection, gyroscope measurements, and orientation detection are suspended. In case the device is determined to be in motion, shock detection, gyroscope measurements, and orientation detection are performed. The power management and accelerometer remain in an always-on state.

The orientation detection detects a current orientation of the device based on accelerometer and gyroscope measurements. Orientation data is temporarily stored, for example, first-in, first-out (FIFO) in memory.

The shock detection detects a shock event based on accelerometer measurements. For example, a shock event upon detection of a large, sudden change in acceleration.

When a shock event is detected, the stored orientation data, an indication of the detected shock event, and a time stamp of the detected shock event are stored in non-volatile memory. The information stored in the non-volatile memory may then be utilized to evaluate the validity of a warranty claim for the device at a later time.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures, functions, and methods of manufacturing electronic devices, electronic components, and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, standard warranties for electronic devices typically offer complementary repair or replacement for damage caused by defective materials or workmanship, and do not cover physical damage caused by the user. Users often deceptively take advantage of the standard warranty for damages caused by shock events, such as accidental falls or drops, since companies are unable to recognize whether damage was caused by the user or not. As a result, companies will often repair devices under standard warranties at their own expense.

The present disclosure is directed to devices and methods for shock and orientation detection. The shock detection detects shock events, and the orientation detection detects the orientation of the device at the time of the shock event. The shock and orientation detection results allow companies to evaluate the validity of warranty claims for electronic devices. The shock and orientation detection are implemented in low power hardware without any host intervention. As a result, the shock and orientation detection disclosed herein has low power consumption and may be implemented as an always-on feature that executes even when the device is in an off or low power state.

Figure 1:
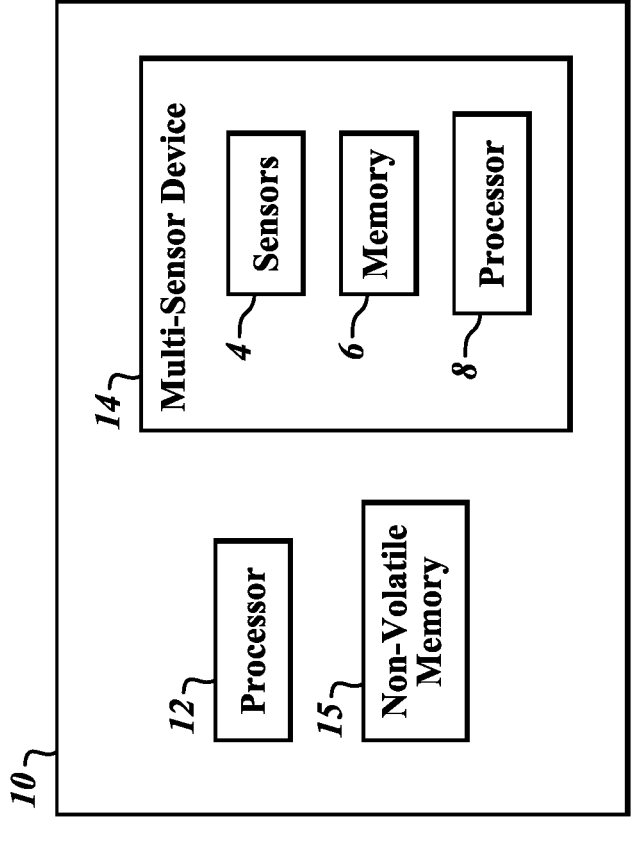
FIG. 1 is a device according to an embodiment disclosed herein.

FIG. 1 is a device 10 according to an embodiment disclosed herein.

The device 10 is an electronic device that is configured to perform shock and orientation detection. The device 10 may be any type of electronic device that may suffer from a shock event, such as a user dropping the device, the user falling or having a sudden accident while carrying the device, or the device suffering from a sudden impact. For example, the device 10 may be a portable device, such as a laptop, tablet, and smartphone, that commonly is dropped by a user. The device 10 includes a processor 12, a multi-sensor device 14, and a non-volatile memory 15. The device 10 may include various other components, such as speakers, a keyboard, display, batteries, etc.

The processor 12 is a host general-purpose processor that performs various functions for the device 10. For example, the processor 12 executes various applications, controls and coordinates hardware components of the device 10, and communicates with any peripheral devices communicatively coupled to the device 10. The processor 12 may include one or more processors.

The multi-sensor device 14 is communicatively coupled to the processor 12. The multi-sensor device 14 includes one or more types of motion sensors 4 including, but not limited to, an accelerometer and a gyroscope that generate motion measurements. The accelerometer and the gyroscope measure acceleration and angular velocity or rate, respectively, along one or more axes of the device 10.

The multi-sensor device 14 also includes its own onboard memory 6, and a processor 8 or processing circuitry coupled to the onboard memory 6. The processor 8 is configured to receive and process data generated by the sensors 4; and execute programs (e.g., a finite state machine, machine learning algorithms, etc.) stored in the onboard memory 6. The processor 8 may include one or more processors.

In contrast to a general-purpose processor like the processor 12, the multi-sensor device 14 is a power-efficient, low-powered device, such as a smart sensor, that consumes between, for example, 100 and 300 microamps for computational requirements during processing. As such, the multi-sensor device 14 may be always on to perform shock and orientation detection without risk of draining the battery of the device 10. For example, the multi-sensor device 14 may continuously perform shock and orientation detection regardless of whether the device 10 is in an on-state, an off-state, or a low power state. As a result, shock and orientation detection results may always be obtained independent of the power state of the device 10.

The non-volatile memory 15 is memory that keeps its stored data even if the device 10 is set to an off state. As discussed in further detail below, detected orientations are stored in the non-volatile memory 15.

Figure 2:
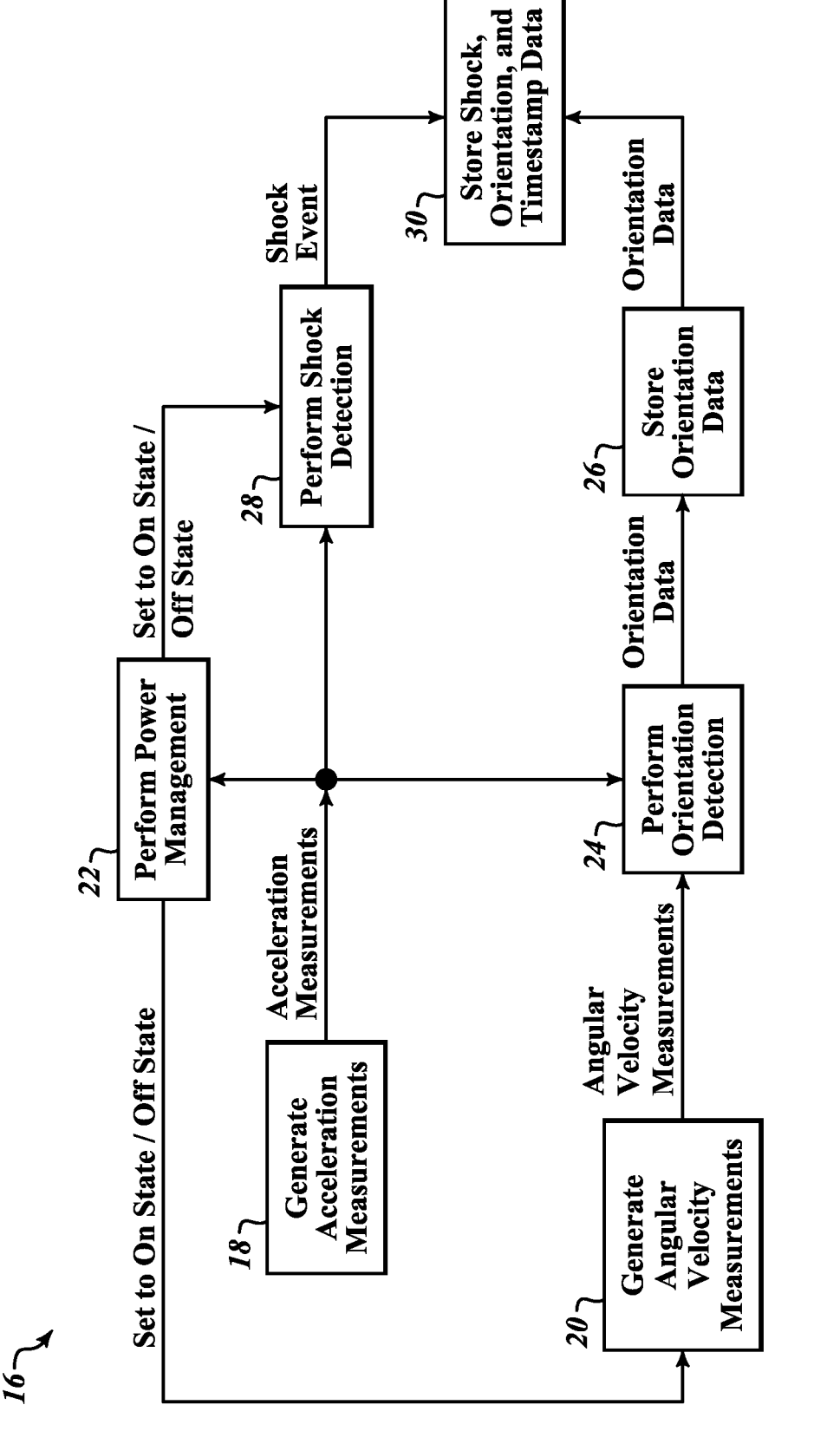
FIG. 2 is a flow diagram of a method for performing shock and orientation detection according to an embodiment disclosed herein.

FIG. 2 is a flow diagram of a method 16 for performing shock and orientation detection according to an embodiment disclosed herein.

The method 16 is executed by the device 10. More specifically, the method 16 is implemented as a program or a set of instructions that can be downloaded and stored in the onboard memory 6 of the multi-sensor device 14, and is executed by the processor 8 included in the multi-sensor device 14. It is also possible for the program for the method 16 to be stored in memory of the device 10, and executed by processor 12 of the device 10.

In block 18, acceleration measurements are generated by the accelerometer included in the multi-sensor device 14 along one or more axes. As discussed in further detail below, the acceleration measurements are utilized for power management in block 22, orientation detection in block 24, and shock detection in block 28.

In block 20, angular velocity measurements are generated by the gyroscope included in the multi-sensor device 14 along one or more axes. As discussed in further detail below, the angular velocity measurements are utilized for orientation detection in block 24. Further, the gyroscope is set to an off state when the device is stationary.

In block 22, the device 10 performs power management in order to conserve power of the device 10. Namely, the device 10 detects whether the device 10 is in a motion state or a stationary state, and sets one or more functions or components to an on state or an off state depending on whether the device 10 is in the motion state or the stationary state.

In the motion state, the device 10 is undergoing any type of motion. In this state, the device 10 is likely being used by a user, and, thus, has a higher likelihood of suffering from a shock event, such as the user dropping the device, the user falling or having a sudden accident while carrying the device, or the device suffering from a sudden impact.

In the stationary state, the device 10 remains still or steady for a determined amount of time. In this state, the device 10 is likely not being used by a user, and, thus, has a lower likelihood of suffering from a shock event.

The device 10 detects the motion state and the stationary state based on acceleration measurements detected in block 18.

The device 10 determines the device 10 is in the motion state in a case where a value of a norm $XL_V$ of the acceleration measurements, which is discussed further below, is equal to or greater than a motion intensity threshold value $TH_{Motion}$ for an amount of time (or a number of acceleration measurement samples) equal to or greater than a motion duration threshold value $T_{Motion}$. Stated differently, the device 10 is detected to be in the motion state when the following condition (1) is satisfied:

$$XL_V \geq TH_{Motion} \text{ for } T_{Motion} \qquad (1)$$

In one embodiment, the motion intensity threshold value $TH_{Motion}$ is between 1.05 and 1.1 g. In one embodiment, the motion duration threshold value $T_{Motion}$ is between 1 and 5 acceleration measurement samples.

The device 10 determines the device 10 is in the stationary state in a case where a value of the norm $XL_V$ of the acceleration measurements is less than the motion intensity threshold value $TH_{Motion}$ for an amount of time (or a number of acceleration measurement samples) equal to or greater than a stationary duration threshold value $T_{Stationary}$. Stated differently, the device 10 is detected to be in the stationary state when the following condition (2) is satisfied:

$$XL_V < TH_{Motion} \text{ for } T_{Stationary} \qquad (2)$$

In one embodiment, the stationary duration threshold value $T_{Stationary}$ is greater than the motion threshold duration amount value $T_{Motion}$. In one embodiment, the stationary duration threshold value $T_{Stationary}$ is between 5 and 10 seconds.

In a case where the accelerometer included in the multi-sensor device 14 is a 3-axis accelerometer, the norm $XL_V$ is calculated using the following equation (3):

$$XL_V = \sqrt{XL_x + XL_y + XL_z} \qquad (3)$$

where $XL_x$, $XL_y$, and $XL_z$ are accelerations along an x-axis, a y-axis transverse to the x-axis, and a z-axis transverse to the x-axis and the y-axis.

In one embodiment, the accelerations $XL_x$, $XL_y$, and $XL_z$ are filtered with a high pass filter prior to calculating the norm $XL_V$ in order to remove direct current (DC) frequency components from the acceleration signals and improve accuracy. In this embodiment, the norm $XL_V$ is a norm of the high pass filtered accelerations $XL_x$, $XL_y$, and $XL_z$; and the motion intensity threshold value $TH_{Motion}$ is between 0.01 and 0.03 g.

In a case where the stationary state is detected, the device 10 sets the gyroscope included in the multi-sensor device 14 and the shock detection to an off state. Stated differently, generation of angular velocity measurements in block 20 and shock detection in block 28 are suspended and no longer performed.

In a case where the motion state is detected, the device 10 sets the gyroscope included in the multi-sensor device 14 and the shock detection to an on state. Stated differently, generation of angular velocity measurements in block 20 and shock detection in block 28 start to be performed.

It is noted that the accelerometer included in the multi-sensor device 14 and the power management in block 22 remain in an always-on state. In the always-on state, the generation of acceleration measurements in block 18 and power management in block 22 continue to be performed even when the device 10 is in an off or low power state.

In one embodiment, in order to minimize power consumption by the accelerometer in the always-on state, the processing rate of the accelerometer is adjusted based on whether the device 10 is in the motion state or the stationary state. For example, the accelerometer measures acceleration at a first rate (e.g., 100 hertz) when the device 10 is in the stationary state, and measures acceleration at a second rate higher than the first rate (e.g., 200 hertz) when the device 10 is in the motion state. This allows additional measurements to be utilized by the shock detection in block 28 and the orientation detection in block 24. A power mode of the accelerometer may also be adjusted based on whether the device 10 is in the motion state or the stationary state. For example, the accelerometer is set to a low power performance mode having a first power consumption when the device 10 is in the stationary state, and is set to a high power performance mode having a second power consumption higher than the first power consumption when the device 10 is in the motion state.

In one embodiment, the orientation detection in block 24 is kept in an always-on state, along with the accelerometer in block 18 and the power management in block 22. In this embodiment, the orientation detection algorithm in block 24 does not have to be re-initialized, and the orientation detection algorithm includes a calibration algorithm for the gyroscope in block 20 upon the gyroscope being set to the on state.

In one embodiment, in a case where the stationary state is detected, the orientation detection in block 24 is set to an off state, along with the gyroscope in block 20 and the shock detection in block 28. As such, orientation detection in block 24 is suspended and no longer performed. In this embodiment, the last detected orientation of the device 10 is saved prior to being set to an off state for later use. Upon being returned to an on state, the orientation algorithm may utilize the last detected orientation as an initial orientation of the device 10. In a case where the motion state is detected, the orientation detection is set to an on state, along with the gyroscope in block 20 and the shock detection in block 28.

In block 24, the device 10 performs orientation detection when orientation detection is set to the always-on state or the on state as discussed above. The orientation of the device 10 is determined based on the acceleration measurements generated in block 18 and the angular velocity measurements generated in block 20. In one embodiment, the detected orientations of the device 10 are represented as quaternions. Orientations are continuously detected while orientation detection is set to the always-on state or the on state. The method 16 then moves to block 26.

In block 26, the orientation data (i.e., the orientations detected in block 24) are stored in the memory 6 of the multi-sensor device 14. In one embodiment, the memory 6 is a volatile memory that erases in response to the device 10 being set to an off state. In one embodiment, orientations are stored with a first-in, first-out (FIFO) method. The memory 6 may also have a configurable depth. In one embodiment, the memory 6 stores the last 10 to 14 detected orientation samples or the orientation samples detected in the last 90 to 110 milliseconds. The depth of the memory 6 indicates an amount of time in which orientation data is stored immediately before a detected shock event. The stored orientation data may later be analyzed to reconstruct the dynamics and motion of the device 10 just prior to a detected shock event.

In block 28, the device 10 performs shock detection when the shock detection is set to the on-state as discussed above. A shock event indicates the device 10 has experienced a large, sudden impact, such as a user dropping the device 10 or the user falling or having an accident while carrying the device 10. A shock event is determined based on the acceleration measurements generated in block 18.

In one embodiment, the device 10 detects a shock event in a case where a value of the norm $XL_V$ of the acceleration measurements is equal to or greater than a shock intensity threshold value $TH_{Shock}$. Stated differently, a shock event is detected when the following condition (4) is satisfied:

$$XL_V \geq TH_{Shock} \qquad (4)$$

In one embodiment, the shock intensity threshold value $TH_{Shock}$ is between 15 and 25 g.

In a case where a shock event is not detected, the device 10 continues to perform shock detection while the shock detection is set to the on state. Shock detection is continued to be performed until the shock detection is set to an off state as discussed above.

In a case where a shock event is detected, the method 16 moves to block 30.

In block 30, the host (e.g., the processor 12) of the device 10 is woken by, for example, an interrupt generated by the processor 8 of the multi-sensor device 14. In response, the host reads all of the current orientation data stored in the memory 6 of the multi-sensor device 14, and stores (i.e., moves) the orientation data in the non-volatile memory 15. Stated differently, the processor 8 of the multi-sensor device 10 transfers the orientation data from the memory 6 of the multi-sensor device 14 to the non-volatile memory 15.

The orientation data is stored in the non-volatile memory 15 along with an indication of the shock event detected in block 28 and a time stamp of the shock event detected in block 28 (i.e., the current time when the shock event was detected). As the orientation data is stored in the non-volatile memory 15 in response to a shock event being detected, the orientation data represents the orientation of device 10 immediately prior to the detected shock event. The information stored in the non-volatile memory 15 may then be utilized to evaluate the validity of a warranty claim for the device 10. In one embodiment, the orientation data in the memory 6 of the multi-sensor device 14 is deleted once the orientation data has been moved.

The various embodiments disclosed herein provide shock and orientation detection for a device, such as a laptop, tablet, smartphone, and smartwatch. The shock detection detects shock events, and the orientation detection detects the orientation of the device at the time of a detected shock event. The detected shock event and orientations are stored in non-volatile memory, and may be used by companies to evaluate the validity of a warranty claim for the device.

A device may be summarized as including: a first memory; a second memory; an accelerometer configured to generate acceleration measurements; a gyroscope configured to generate angular velocity measurements; and one or more processors configured to: determine the device is in a stationary state or a motion state based on the acceleration measurements; perform orientation detection to detect orientations of the device based on the acceleration measurements and the angular velocity measurements in case the device is determined to be in the motion state; store the orientations of the device in the first memory; perform shock detection to detect a shock event based on the acceleration measurements in case the device is determined to be in the motion state, the shock event indicating the device has experienced an impact; and move the orientations of the device from the first memory to the second memory in case the shock event is detected.

The first memory may store the orientations of the device using a first-in, first-out (FIFO) method.

The second memory may be a non-volatile memory.

The device may further include a multi-sensor device including the accelerometer, the gyroscope, and the first memory.

The one or more processors may be configured to delete the orientations of the device from the first memory after the orientations have been moved from the first memory to the second memory.

The one or more processors may be configured to set the gyroscope and the shock detection to an off state in case the device is determined to be in the stationary state.

The one or more processors may be configured to set the gyroscope, the shock detection, and the orientation detection to an off state in case the device is determined to be in the stationary state.

The one or more processors may be configured to: filter the acceleration measurements; determine a norm of the filtered acceleration measurements; and determine the device is in the stationary state or the motion state based on the norm of the filtered acceleration measurements.

The acceleration measurements may be filtered with a high pass filter.

The one or more processors may determine the device is in the motion state in case the norm of the filtered acceleration measurements is greater than or equal to a threshold value for a first determined amount of time, and may determine the device is in the stationary state in case the norm of the filtered acceleration measurements is less than the threshold value for a second determined amount of time.

The one or more processors may be configured to: determine a norm of the acceleration measurements; and detect the shock event based on the norm of the acceleration measurements.

The one or more processors may detect the shock event in case the norm of the acceleration measurements is greater than or equal to a threshold value.

Accelerometer may have a first power consumption and measure acceleration at a first rate in case the device is determined to be in the stationary state, and the accelerometer may have a second power consumption greater than the first power consumption and measure acceleration at a second rate higher than the first rate in case the device is determined to be in the motion state.

The one or more processors may include: a first processor configured to determine the device is in the stationary state or the motion state, perform the orientation detection, store the orientations of the device in the first memory, and perform the shock detection; and a second processor configured to move the orientations of the device from the first memory to the second memory.

A method may be summarized as including: generating, by an accelerometer, acceleration measurements; determining, by a processor, a device is in a stationary state or a motion state based on the acceleration measurements; generating, by a gyroscope, angular velocity measurements in case the device is determined to be in the motion state; performing, by the processor, orientation detection to detect orientations of the device based on the acceleration measurements and the angular velocity measurements in case the device is determined to be in the motion state; storing the orientations of the device in a first memory; performing shock detection to detect a shock event based on the acceleration measurements in case the device is determined to be in the motion state, the shock event indicating the device has experienced an impact; and moving the orientations of the device from the first memory to a second memory in case the shock event is detected.

The storing of the orientations of the device may include storing the orientations of the device in the first memory using a first-in, first-out (FIFO) method.

The method may further include setting, by the processor, the gyroscope and the shock detection to an off state in case the device is determined to be in the stationary state.

The method may further include: filtering, by the processor, the acceleration measurements; determining, by the processor, a norm of the filtered acceleration measurements; and determining, by the processor, the device is in the stationary state or the motion state based on the norm of the filtered acceleration measurements.

A device may be summarized as including a multi-sensor device including: a first memory; an accelerometer configured to generate acceleration measurements; a gyroscope configured to generate angular velocity measurements; and a first processor configured to: determine the device is in a motion state based on the acceleration measurements; detect orientations of the device based on the acceleration measurements and the angular velocity measurements in response to the device being determined to be in the motion state; store the orientations of the device in the first memory; and detect a shock event based on the acceleration measurements in response to the device being determined to be in the motion state, the shock event indicating the device has experienced an impact; a second memory; and a second processor configured to move the orientations of the device from the first memory to the second memory in response to the shock event being detected.

The first processor may be configured to: determine the device is in a stationary state based on the acceleration measurements; and suspend generation of the angular velocity measurements, detection of the orientations, and detection of the shock event in response to the device being determined to be in the stationary state.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a first memory;
a second memory;
an accelerometer configured to generate acceleration measurements;
a gyroscope configured to generate angular velocity measurements; and
one or more processors configured to:
determine the device is in a stationary state or a motion state based on the acceleration measurements;
perform orientation detection to detect orientations of the device based on the acceleration measurements and the angular velocity measurements in case the device is determined to be in the motion state;
store the orientations of the device in the first memory;
perform shock detection to detect a shock event based on the acceleration measurements in case the device is determined to be in the motion state, the shock event indicating the device has experienced an impact; and
move the orientations of the device from the first memory to the second memory in case the shock event is detected.

2. The device of claim 1 wherein the first memory stores the orientations of the device using a first-in, first-out (FIFO) method.

3. The device of claim 1 wherein the second memory is a non-volatile memory.

4. The device of claim 1, further comprising:
a multi-sensor device including the accelerometer, the gyroscope, and the first memory.

5. The device of claim 1 wherein the one or more processors are configured to:
delete the orientations of the device from the first memory after the orientations have been moved from the first memory to the second memory.

6. The device of claim 1 wherein the one or more processors are configured to:
set the gyroscope and the shock detection to an off state in case the device is determined to be in the stationary state.

7. The device of claim 1 wherein the one or more processors are configured to:
set the gyroscope, the shock detection, and the orientation detection to an off state in case the device is determined to be in the stationary state.

8. The device of claim 1 wherein the one or more processors are configured to:
filter the acceleration measurements;
determine a norm of the filtered acceleration measurements; and
determine the device is in the stationary state or the motion state based on the norm of the filtered acceleration measurements.

9. The device of claim 8 wherein the acceleration measurements are filtered with a high pass filter.

10. The device of claim 8 wherein the one or more processors determine the device is in the motion state in case the norm of the filtered acceleration measurements is greater than or equal to a threshold value for a first determined amount of time, and determines the device is in the stationary state in case the norm of the filtered acceleration measurements is less than the threshold value for a second determined amount of time.

11. The device of claim 1 wherein the one or more processors are configured to:
determine a norm of the acceleration measurements; and
detect the shock event based on the norm of the acceleration measurements.

12. The device of claim 11 wherein the one or more processors detect the shock event in case the norm of the acceleration measurements is greater than or equal to a threshold value.

13. The device of claim 1 wherein accelerometer has a first power consumption and measures acceleration at a first rate in case the device is determined to be in the stationary state, and the accelerometer has a second power consumption greater than the first power consumption and measures acceleration at a second rate higher than the first rate in case the device is determined to be in the motion state.

14. The device of claim 1 wherein the one or more processors include:
a first processor configured to determine the device is in the stationary state or the motion state, perform the orientation detection, store the orientations of the device in the first memory, and perform the shock detection; and
a second processor configured to move the orientations of the device from the first memory to the second memory.

15. A method, comprising:
generating, by an accelerometer, acceleration measurements;
determining, by a processor, a device is in a stationary state or a motion state based on the acceleration measurements;
generating, by a gyroscope, angular velocity measurements in case the device is determined to be in the motion state;
performing, by the processor, orientation detection to detect orientations of the device based on the acceleration measurements and the angular velocity measurements in case the device is determined to be in the motion state;
storing the orientations of the device in a first memory;
performing shock detection to detect a shock event based on the acceleration measurements in case the device is determined to be in the motion state, the shock event indicating the device has experienced an impact; and
moving the orientations of the device from the first memory to a second memory in case the shock event is detected.

16. The method of claim 15 wherein the storing of the orientations of the device includes storing the orientations of the device in the first memory using a first-in, first-out (FIFO) method.

17. The method of claim 15, further comprising:
setting, by the processor, the gyroscope and the shock detection to an off state in case the device is determined to be in the stationary state.

18. The method of claim 15, further comprising:
filtering, by the processor, the acceleration measurements;
determining, by the processor, a norm of the filtered acceleration measurements; and
determining, by the processor, the device is in the stationary state or the motion state based on the norm of the filtered acceleration measurements.

19. A device, comprising:
a multi-sensor device including:

a first memory;

an accelerometer configured to generate acceleration measurements;

a gyroscope configured to generate angular velocity measurements; and a first processor configured to:

determine the device is in a motion state based on the acceleration measurements;

detect orientations of the device based on the acceleration measurements and the angular velocity measurements in response to the device being determined to be in the motion state;

store the orientations of the device in the first memory; and detect a shock event based on the acceleration measurements in response to the device being determined to be in the motion state, the shock event indicating the device has experienced an impact;

a second memory; and a second processor configured to move the orientations of the device from the first memory to the second memory in response to the shock event being detected.

20. The device of claim 19 wherein the first processor is configured to:

determine the device is in a stationary state based on the acceleration measurements; and suspend generation of the angular velocity measurements, detection of the orientations, and detection of the shock event in response to the device being determined to be in the stationary state.

* * * * *